United States Patent Office 3,310,111
Patented Mar. 21, 1967

3,310,111
METHOD OF CONTROLLING SOLIDS IN
FLUIDS FROM WELLS
Joseph P. Pavlich and David G. Calvert, Tulsa, Okla.,
assignors to The Dow Chemical Company, Midland,
Mich., a corporation of Delaware
No Drawing. Filed Feb. 17, 1964, Ser. No. 345,084
10 Claims. (Cl. 166—33)

The invention relates to a method of treating a fluid-bearing formation penetrated by a well. It particularly relates to a method of treating a formation composed of or containing unconsolidated or incompetent strata, or contiguous to a formation containing such strata, and resulting in objectionable detritus or detrital material in the fluid being produced. By detritus or detrital material is meant herein float sand, marl, or earth particles of any type which tend to loosen from the formation and interfere with production or cause suspended matter or sediment in the fluid being produced.

In the production of fluids such as natural gas, water, brine, and petroleum, producers thereof are frequently confronted with the presence of detrital material, of the nature of that mentioned above, which has become detached from disintegrating reservoir rock and is carried into the wellbore by the fluid being produced. The problem is particularly troublesome in petroleum-producing wells which produce from incompetent formations. Some of such detached material is carried up with the petroleum and must be removed therefrom by centrifugation or otherwise. Due to the abrasive character of the material, it causes excessive wear on pumping and transfer equipment. An appreciable portion of such detached material accumulates in the lower portions of the wellbore, thereby causing loss in efficiency of the well. Such accumulations frequently cause a shut-down of the well for lack of adequate fluid flow, necessitating a well-cleaning job. It is common for wells producing from incompetent formations to require frequent cleaning due to accumulations of such detrital material.

There has long existed a need for a satisfactory method of overcoming the problems associated with the detrital material which migrates into a wellbore or is carried therein by the fluids being produced. Numerous attempts have been made to overcome the problems. Among such attempts are underreaming to increase the hole size and employing a limiting choke which reduces the rate of flow from the well so that the movement of the flow toward the wellbore is reduced. Other methods include the use of a gravel pack or a pebble screen, which comprises forms of coarse filter beds, and the use of plastics or resins, which set in situ, thereby cementing earth particles adjacent to the wellbore into a more or less monolithic conglomeration. These attempts have not been fully satisfactory because of a number of reasons among which are the failure of the treated formation to screen out the detrital material, the blockage of fluid flow, the gradual breakdown of the resin-consolidated material due to erosion and chemical action. One reason for the breakdown of the resin-consolidated material is the poor bond initially formed between the particles of the formation and the resin.

There exists, therefore, a desideratum in the art for an improved method of consolidating incompetent fluid-producing formations. Accordingly, the principal object of the invention is to fulfill this need. Other objects and advantages of the invention will become apparent as the description thereof proceeds.

The invention is predicated upon the discovery that an effective fluid-permeable barrier to the passage of detrital material can be provided by injecting a novel resin composition comprising, and having intimately incorporated therein, a bonding component whereby the resin is firmly bonded to the earthen particles of the formation.

The invention comprises: injecting into a fluid-bearing formation, having an incompetent stratum therein, a resin composition consisting essentially of a liquid resin settable in situ and a selected bonding material, to which reference will usually be made hereinafter as glycidyloxypropyltrimethoxysilane, in an amount of between about 0.15 and about 10.0 percent, usually between about 0.5 and 5 percent, by volume of the resin composition employed, at a pressure sufficient to force a substantial portion of the composition into the interstitial spaces or pores among the particles of the incompetent stratum, particularly of the portions thereof which are exposed and which are in the proximity of the exposed surfaces of the incompetent formation.

Where the stratum to be treated lies in a water or oil-producing formation penetrated by a well, best results are obtained by pre-flushing the well with an organic liquid among which are such hydrocarbon liquids as kerosene, naphtha, gasoline, lightweight diesel and fuel oils, hexane, pentane, toluene, and benzene. The amount of organic liquid employed in the pre-flush, when needed, is usually between about 1 and 5 times the volume of resin composition to be used. It is also advisable to post-flush, following injection of the resin composition, with one of the above organic liquids, about 1 to 3 times the volume of resin usually being adequate. Although the presence of most crude oils in the stratum being treated lessens the efficacy of the consolidation treatment, the presence of certain high gravity, high quality crudes may not be detrimental.

The amount of resin to employ in the consolidation treatment may vary rather widely, dependent upon the nature of the stratum being consolidated. It is recommended that the pore volume of the stratum be ascertained prior to treatment. This may be readily done by placing a sample of the stratum in a suitable vessel and determining the volume of the pores or interstitial voids. This is best done by employing a Beckman, Model 930, Air Comparison Pycnometer. The amount of resin to employ may advantageously be varied between about 0.25 of the pore volume and about four, or even nine, times the pore volume. The amount of bonding material employed is then based upon the volume of resin used. It has been found that amounts of resin falling within the lower range, say between about .5 to 2 pore volumes, give adequate strength and greater fluid permeability than when the higher pore volumes of resin are employed.

Crude oil or brine may, of course, be employed to displace the resin composition further back into a stratum being treated, particularly after post-flushing with diesel oil or kerosene.

Air permeability, which is ascertained by passing air through a core of the formation, measuring the flow rate in cubic centimeters per second (employing an apparatus known as a permeameter), and calculating according to Darcy's formula, is excellent in formation sample cores treated according to the invention.

Similarly, the compressive strength of incompetent formation cores, treated according to the invention, as determined by tests employing a Tinius Olsen Tester, was excellent.

A particular advantage of the invention resides in the fact that the bonding material may be admixed directly with the resin, either prior to or during injection down the wellbore.

The resin suitable for use in the practice of the invention is one which mixes readily with the bonding material and which, together with the bonding material, forms a cohesive network that adheres to the individual particles which compose the formation. It must not fill completely the interstices between the particles, for such would thereby seriously impair the fluid-permeability of the consolidated formation so formed. It must be sufficiently viscous to remain substantially uniformly dispersed. It must be soluble or dispersible in a carrier liquid but substantially unreactive therewith. It must also resist being dislodged from the particles during the resin-setting period in the well. The resin must be of a class described as settable, that is, one that sets or hardens either by its merely being retained in place for a limited time period or one in which the hardening process is initiated or accelerated by a chemical catalyst. It must be of a durable nature and resistant to attack by materials normally present in the rock formations or in well-treating agents commonly used.

The resin employed may be an epoxy resin, a melamine-aldehyde resin, a urea-aldehyde resin, or a phenol-aldehyde resin, each of which is dissolved, prior to use according to the invention in an organic solvent of which the following are illustrative: lightweight hydrocarbons, e.g., kerosene, naphtha, toluene, benzene, pentane, hexane, octane, light diesel oil and heating oils and mixtures thereof, or $C_1$ to $C_4$ aliphatic alcohols, e.g., methyl, ethyl, isopropyl alcohol, and mixtures thereof.

The phenol-formaldehyde resins are among the particularly effective resins for use in the invention because by variations in the formulation of the reaction mixture, as hereinafter described, setting times thereof may be adjusted to meet various temperature conditions in the well at levels at which the consolidation is to be done. This property is highly advantageous because it permits easy handling of the resin mass during injection into the well and because the period of set may be adjusted to permit adequate time for admixing the bonding material therewith, for preparing the dispersion in the carrier liquid, and for injecting the resin-bonding material composition down the well and into the formation.

Novalac resins may also be employed if desired. Such resins are the thermoplastic resins formed by reacting formaldehyde with less than a 1:1 molar ratio of phenol, usually in the presence of an acid catalyst. Such resins are thereafter further reacted with additional aldehyde which may be more formaldehyde or an aldehyde donor such as hexamethylenetetramine to render them, upon subsequent set, thermosetting.

Hardening or setting agents, sometimes referred to as catalysts, are usually incorporated into the monomeric mixture or the catalysts may be withheld from the mixture and brought into contact with the mixture after the mixture has been injected and positioned as desired in the well, as by dissolving, subsequent to injection, a suitable catalyst in a carrier liquid and circulating the liquid, contaning the catalyst thus dissolved, in the well. The catalyst, however, may often be admixed with the resin prior to injection down the well. Slower acting catalysts are usually used when added prior to injection of the slurry, whereas a faster acting catalyst may be employed when used after the slurry has been injected.

Epoxy resin, however, by employing selected mixtures of diglycidyl ethers, and judicious selection of hardening agents, particularly mixtures thereof, e.g., an alkanolamine and a polyoxyalkylene polyamine, may be made to meet a wide variety of conditions.

Both phenol-formaldehyde resins and epoxy resins are particularly suitable because they lend themselves to the supplemental beneficial effect of the bonding material and as a result, when used according to the invention, form especially strong adhesive bonds with the formation material. Since the primary function of the resin is to serve as an effective binder of the masses of solid particles comprising the incompetent formation, both during the setting period and thereafter in service as a barrier, such adhesive property is highly necessary.

Illustrative recipes, are set out in Examples 1 to 3 below, for the preparation of liquid phenol-formaldehyde resins capable of setting in the earth formation within various ranges of temperatures, as indicated, when suitably catalyzed.

*Example 1*

An adhesive resin for use in the temperature range of 200° to 280° F. is prepared as follows: Mix together 1538 pounds of formaldehyde solution (37 percent by weight formaldehyde, balance water), 1179 pounds of phenol, and 35 pounds of 20° Bé. hydrochloric acid. Heat the mixture to a temperature of 150° F. until it becomes cloudy. This heating usually requires from about 15 to 20 minutes. After the cloudy stage is reached, continue heating for an additional 30 minutes. At the end of this heating period, mix 16 pounds of sodium hydroxide into the mixture. As a result, the mixture separates into two liquid phases which are allowed to stratify. The resulting upper layer is largely water and is discarded. The resulting bottom layer, which has a volume of about 150 gallons, is a thick partially condensed phenol-formaldehyde liquid resin having a viscosity of from about 700 to 950 cps. at 80° F., a pH value of between 4.8 and 5.2, and a density of about 9.9 pounds per gallon. This liquid resin is stable at ordinary temperatures for about 6 to 8 months. During this time, it may be caused, at any time desired, to set to a hard strong solid by admixture therewith of a suitable catalyst.

*Example 2*

An adhesive resin for use in the temperature range of 160° to 220° F. is prepared as follows: Mix together 390 pounds of phenol, 506 pounds of formaldehyde solution (37 percent by weight of formaldehyde, balance water) and 50 pounds of a 50 percent solution of sodium hydroxide in water. Hold the mixture at about 175° F. for about 2.5 hours, allowing the phenol and formaldehyde to partially condense, i.e., to react together to a limited extent. Then mix the so-obtained reaction mass with sufficient hydrochloric acid to lower the pH value to between about 4 and 6. This usually requires about 6.4 gallons of about 32 percent by weight, or the equivalent, of aqueous hydrochloric acid solution. As the acid is added, the mixture separates into two phases which are allowed to stratify. The upper layer, which constitutes about 38 percent of the total volume, is largely salt water and, after allowing the reaction mass to cool to room temperature, is discarded. The lower layer comprises a slightly acid, partially condensed, aqueous phenol-formaldehyde liquid resin. It has a viscosity of between about 150 and 400 centipoises (cps.), a pH value of between 4.8 and 5.2 and a density of about 10 pounds per gallon. This liquid is stable for long periods of time but is capable of hardening when suitably catalyzed.

Example 3

An adhesive resin for use in the temperature range of from 70° to 170° F. is composed of two liquid resins, described as follows: One of the two liquid resins is prepared by adding 410 pounds of resorcinol to the liquid prepared in Example 2 above and mixing until dissolved. A liquid plastic resin is thereby obtained which is an aqueous, partially condensed, phenolformaldehydepolyhydroxy benzene resinous liquid. It has a viscosity of about 150 cps. and a density of about 10.2 pounds per gallon. It may be stored at room temperature for as long as 6 to 8 weeks without objectionable deterioration. The other of the two liquid resins is made by mixing together 1116 pounds of cresylic acid, 1068 pounds of an aqueous solution of formaldehyde (37 percent by weight formaldehyde, balance water), 534 pounds of paraformaldehyde, and 67 pounds of about a 50 percent aqueous solution of sodium hydroxide. The mixture is heated to a temperature of 125° F. and maintained at this temperature until the mixture becomes clear. This clarification takes place usually in about 30 minutes. To the product so-obtained is added 26 gallons of about 15 percent hydrochloric acid solution. The addition of the acid brings about the formation of two liquid phases which are allowed to stratify into two layers. The upper layer is largely water and is discarded. After discarding the upper layer, the remaining lower layer is heated to about 175° F. for from about 1 to 1.5 hours, so as to bring the viscosity as measured at 80° F., to about 200 cps. The resulting liquid plastic has a pH value of between about 3.7 and 4.3 and a density of about 9.5 pounds per gallon. The amount obtained is about 205 gallons. The two liquid resins, thus made, are mixed together in about equal volumes just prior to use. The mixture gradually hardens as it ages. However, a hardening agent or catalyst, e.g. NaOH within the ranges suggested in Tables 2 and 3, infra, is usually used. It is understood that variations in relative amounts of components and the use of obvious equivalents may be found expedient and that the above recipes are illustrative only.

A suitable hardening or setting agent or catalyst is generally added to the liquid phenol-aldehyde resin. It may be admixed into the resin as a final step in its preparation or to the mass of resin-coated particles after or during the mixing thereof. Suitable hardening agents for phenol-formaldehyde resins, such as those in Examples 1 to 3, are alkaline materials, e.g. sodium hydroxide, potassium carbonate, potassium hydroxide, and amines such as monoisopropylamine, monoethanolamine, triethanolamine, and phenylethanolamine.

Table I shows operable ranges of some hardening agents and mixtures thereof with liquid resins made according to Examples 1 to 3.

TABLE I

| Liquid Resin Adhesive | Temp. Range, °F. | Hardening Agent | Fluid ounces of Agent per Gallon of Resin |
| --- | --- | --- | --- |
| Example 3 | 70 to 120 | Monoisopropylamine | 1 to 5. |
| Do | 120 to 170 | NaOH, 50% aqueous solution | 1 to 3.2. |
| Example 2 | 160 to 220 | Aqueous solution of 43% $K_2CO_3$+ 6.5% KOH. | 1 to 19. |
| Example 1 | 200 to 280 | 50% aqueous solution of $K_2CO_3$ | 1 to 19. |

The choice and amount of hardening agent to use will depend upon conditions and circumstances. The state of condensation of the resin and the ambient temperature, both at the wellhead and in the formations penetrated by the well to be treated, are conditions of importance for consideration. A circumstance of particular importance, which affects the choice and amount of agent to be added to the mixture (when it is added to the mixture before it is placed in the well), is the anticipation of the period of time to elapse between addition of the hardening agent and positioning the mixture at the desired level in the well. Provision must be made for a period sufficiently long to insure the adhesive property of the resin being substantially unimpaired while the resin is being placed in the incompetent formation.

Table II sets forth maximum surface working periods for two different temperatures at the wellhead and the setting or hardening periods required in the well at three different well temperatures. Three different concentrations of sodium hydroxide are suggested for use with phenol-aldehyde resins of Examples 1 and 2.

TABLE II

| Resin made according to Previous Example | Fluid Ounces of 25% NaOH Aqueous Solution per Gallon of Resin | Surface Working Time in Hours | | Shut-in Time in Hours | | |
| --- | --- | --- | --- | --- | --- | --- |
| | | 70° F. | 100° F. | 120° F. | 140° F. | 160° F. |
| 1 | 0.5 | 20 | 6.5 | 28 | 7 | 2.2 |
| 2 | 1.0 | 14 | 5 | 18 | 3.5 | 1.2 |
| 2 | 2.0 | 9 | 3 | 9.5 | 1.8 | 1.2 |

Epoxy resins, as aforesaid, are another particularly effective resin to employ in the practice of the invention. A well known type is prepared by reacting an aromatic polyhydric compound, e.g., isopropylidenediphenol, with a molar excess of epichlorohydrin in an aqueous reaction medium in the presence of a dehydrochlorinating agent, e.g. KOH or NaOH, and recovering the resulting ether or polyether. The polyether is the higher molecular weight ethers containing repeating ether units and which are formed in increasing amounts as the molar excess of epichlorohydrin over the hydroxy compound employed is lessened.

A second type of epoxy resin useful in the practice of the invention is prepared by reacting an aliphatic polyhydric compound, e.g. polypropylene glycol, with epichlorohydrin in the presence of a Lewis acid catalyst, e.g. $BF_3$, and thereafter admixing a base therewith, e.g. an aqueous solution of sodium aluminate, sodium silicate, or sodium hydroxide.

The higher molecular weight epoxy resins resulting when an aromatic polyhydric compound is employed in the preparation thereof are usually solids at room temperature and will require moderate heat to convert them to liquids. The lower molecular weight epoxy resins resulting when an aromatic polyhydric compound is employed are usually relatively low-viscosity liquids at room temperature as are the epoxy resins resulting when aliphatic polyhydric compounds are employed in the preparation thereof. It may be found advantageous to employ a mixture of epoxy resins including a portion resulting when an aromatic hydroxy compound is employed and a portion resulting when an aliphatic hydroxy compound is employed in the preparation thereof.

Epoxy resins are available in alcohol solutions or in a substantially dehydrated form which may be mixed with an alcohol for use in the practice of the invention.

Epoxy resins are converted to a thermoset, hard durable, strong, corrosion- and erosion-resistant solid by admixing with the liquid epoxy resin any one of a number of hardening or curing agents (or in some instances, mixtures thereof), principal of which are primary, secondary, and tertiary amines, dicarboxylic acids or their anhydrides, and Lewis acids, e.g. $BF_3$ and particularly the diethyl ether complex of $BF_3$.

Details on the preparation and cure of epoxy resins may be found in Epoxy Resins by Lee and Neville, (1957), published by McGraw-Hill Publishing Company in New York, and in a large number of patents, some of which are U.S. Patents 2,467,171, 2,581,464, 2,582,985, and 2,615,007.

The bonding composition or agent incorporated into the resin composition for use in consolidating incompetent strata in accordance with the invention may be considered to be the glycidyl ether of propyltrimethoxysilane having the formula:

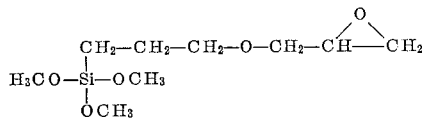

It may be more specifically referred to as [3-(glycidyloxy)propyl] trimethoxysilane or as [3-(2,3-epoxypropoxy)propyl] trimethoxysilane.

This ether, for use as the bonding material in the practice of the invention, may be obtained from the Dow-Corning Corporation, Midland, Mich.

One method of preparing this ether is to react trimethoxysilane with allyl glycidyl ether, usually en mass, at a convenient temperature, e.g., room temperature, in the presence of a platinum catalyst, whereupon the allyl glycidyl ether adds to the silicon atom at the double bond, the hydrogen atom originally attached to the silicon atom thereupon attaching itself to the terminal carbon atom of the original double bond. The reaction, therefore, would be expected as follows:

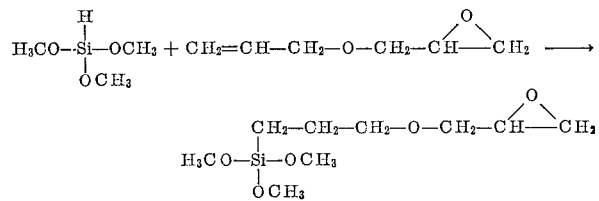

In the practice of the invention the bonding composition so made reacts both with the resin and also with the earthen particles of which the formation is composed, probably through the epoxide often called oxirane groups and/or through the methoxy groups.

The invention is carried out by preparing the resin to be used, e.g. phenol-formaldehyde or epoxy as described above, and admixing therewith the glycidyl ether of propyltrimethoxysilane in an organic medium selected from those set out above. The order of addition is not critical, e.g. the resin may be first dissolved in the organic medium and thereafter the bonding composition admixed therewith or the resin and the bonding composition may be intermixed and then subsequently mixed with the organic medium or the bonding composition only may be first admixed with the organic medium and thereafter the resin admixed therewith. The amount of organic medium to employ is not critical so long as the resulting mixture is a readily pumpable fluid composition. The bonding composition may be employed in an amount anywhere within the limits above suggested. However, in a practical sense, an amount is employed which attains the objective of the invention, viz. the creation of a firm bond between the earthen particles of the formation and the resin. This amount, as aforesaid, is usually between about 0.5 and 5.0 percent by volume of the bonding composition, based upon the volume of the resin composition employed.

If desired, to ascertain an optimum amount of the bonding material to employ, a preliminary test may be run wherein samples of the particles from the formation are admixed with the resin to be employed, with which there have been admixed varying amounts of the bonding material, the resin samples so treated allowed to set, and the resulting consolidated conglomerates examined and compared. The consolidation treatment then employed is based upon the sample which was observed to represent the best results.

After the composition has been prepared in the manner described above, it is injected down the wellbore penetrating an incompetent stratum, usually down a string of tubing which forms an annulus with either the casing of the well or the wellbore in instances where there is no casing, the annulus being closed to upward movement therethrough by a packer. The resinous composition is injected at a pressure sufficiently great to force it into the unconsolidated stratum of the formation being treated and pressure maintained thereon for sufficient time after injection to permit the resin to set to monolithic or unitary solid. In accordance with common practice, where the well is provided with a casing, perforations exist in the casing at the stratum to be treated. If perforations are not already there, they are made by common practice such as by means of a perforating gun prior to treatment.

It is recommended that the packer be released after the resin composition has been injected and the tubing and annulus flushed out to remove any residual material therefrom before the resin has fully set. After the resin has set it is sometimes advisable to drill out any residual resin composition which may have settled in the lower part of the wellbore.

Water, brine, and some crude oils have a deleterious effect on the resinous composition containing the bonding material. Therefore, in treating a stratum which is producing oil or water it is recommended that the well be first flushed out with one of the organic media named above, e.g. kerosene, to remove oil and water therefrom and leave the tubing filled with the organic medium employed.

Tests were conducted on samples obtained from an incompetent oil-bearing formation wherein various amounts of the glycidyloxypropyltrimethoxysilane and the phenol-formaldehyde resin made as described below were admixed therewith. The amount of resin employed was varied between 0.25 and 9 times the pore volume of the sample. In some tests, the sample was not preflushed and in others they were preflushed with one of kerosene, hexane, xylene, or toluene.

The air permeability and compressive strength values were obtained on the various samples employing a permeameter and a Tinius Olsen Tester, respectively, as aforementioned.

The results of pertinent tests are shown in Table III below:

this level. A packer was set in the annulus between casing and tubing at 5,031 feet.

TABLE III

| Test No. | Pre-Flush Type | Pre-Flush Number of Pore Volumes | Resin added[1] based on Pore Volume of Core | Bonding[2] Material added, based on Volume of Resin in percent | Post-Flush Type | Post-Flush Number of Pore Volumes | Average Air Permeability | Average Compressive Strength |
|---|---|---|---|---|---|---|---|---|
| 1 | Kerosene | 4 | 1 | 1 | None | | 6,400 | 1,150 |
| 2 | ----do---- | 4 | 1 | 1 | Kerosene | 1 | 5,600 | 850 |
| 3 | ----do---- | 4 | 1 | 1 | ----do---- | 4 | 8,400 | 775 |
| 4 | ----do---- | 4 | 1 | 1 | ----do---- | 6 | 9,000 | 475 |
| 5 | ----do---- | 4 | 3 | 1 | ----do---- | 1 | 9,100 | 1,025 |
| 6 | ----do---- | 4 | 3 | 1 | ----do---- | 4 | 9,100 | 1,125 |
| 7 | ----do---- | 4 | 1 | 1 | Kerosene | 3 | 6,550 | 500 |
| 8 | ----do---- | 4 | 1 | 0.167 | ----do---- | 1 | (3) | (3) |
| 9 | ----do---- | 4 | 3 | 0.167 | ----do---- | 1 | (3) | (3) |
| 10 | ----do---- | 4 | 9 | 0.167 | ----do---- | 3 | 5,500 | 550 |
| 11 | ----do---- | 4 | 1 | None | ----do---- | 2 | 900 | 125 |
| 12 | Hexane | 4 | 1 | None | Hexane | 2 | (4) | 205 |
| 13 | Xylene | 4 | 1 | None | Xylene | 2 | (3) | (3) |

[1] The ingredients identified as A and B, infra, in substantially equal volume proportions, catalyzed with NaOH.
[2] [3-(glycidyloxy)propyl] trimethoxysilane.
[3] Did not consolidate.
[4] Not measurable.

In the absence of the glycidyloxypropyltrimethoxysilane, both the air permeability and the compressive strength were unsatisfactory (Test numbers 11, 12, and 13) and when the amount approached 0.5, the results (Test numbers 8 to 10) were unsatisfactory unless an excessive amount of resin was employed (Tests number 10). When the resin was employed in an amount of between 1 and 3 times the pore value, the results of both air permeability and compressive strength were superior to those obtained when greater or lesser amounts of resin were employed, providing, that the amount of bonding material was as much as 1% by volume of the resin. The test values indicate that some benefit could be realized by employing as little as 0.15 percent of the bonding material, based on the weight of resin used.

The tests showed that when kerosene, hexane, xylene, or toluene was employed as a pre-flush through the core, the results were enhanced. They also showed that a post-flush of any one of these liquids, especially in the higher amounts, the permeability and compressive strength values were enhanced. The amounts of liquid employed in the pre-flushes and post-flushes were between 1 and 6 times the resin volume. However, neither a pre-flush or post-flush is necessary for the practice of the invention unless the cores show the presence of some water, brine, or lower gravity crude.

As illustrative of the results obtained, an air permeability of 6400 millidarcies and a compressive strength of 1150 pounds per square inch (Test number 1) were obtained when the sample was pre-flushed with 4 times the pore value and the resin was employed in an amount of 1 times the pore volume, containing 1 percent by volume of glycidyloxypropyltrimethoxysilane without post-flushing. When other samples were post-flushed with kerosene to the extent of 4 times the pore volume, an air permeability of 8400 millidarcies and a compressive strength of 775 pounds per square inch (Test number 3) were obtained. When the amount of resin was increased to 3 times the pore volume, and other conditions held constant including the kerosene preflush to the extent of four pore volume (Test number 5), a permeability of 9100 millidarcies and a compressive strength of 1125 pounds per square inch were obtained.

A formation, penetrated by a cased well provided with tubing, in Liberty County, Texas, contained an unconsolidated oil-bearing stratum at a level of between about 5,046 feet and 5,052 feet. The casing was perforated at this level. A packer was set in the annulus between casing and tubing at 5,031 feet.

The following ingredients for a resin composition were prepared:

INGREDIENT A

| Material: | Percent by weight |
|---|---|
| Cresylic acid | 20.80 |
| Paraformaldehyde | 17.30 |
| 50% aqueous solution of NaOH | 0.64 |
| 32% aqueous solution of HCl | 0.76 |
| Ethyl alcohol | 60.50 |
| | 100.00 |

INGREDIENT B

| Phenol | 12.85 |
|---|---|
| 40% by volume formaldehyde | 16.67 |
| 50% aqueous solution of NaOH | 1.65 |
| 32% aqueous solution of HCl | 2.04 |
| Resorcin | 13.51 |
| Ethyl alcohol | 53.28 |
| | 100.00 |

INGREDIENT C

Glycidyloxypropyltrimethoxysilane prepared as described above.

Sufficient 50% aqueous solution of NaOH was admixed with 150 gallons of Ingredient A to raise the pH value to between about 8 and 10. This provided enough catalyst for both Ingredient A and B when subsequently admixed.

150 gallons of Ingredient B and 3 gallons of Ingredient C were then admixed with Ingredient A.

25 barrels of diesel oil were displaced into the tubing at an average pumping rate of 0.25 barrel per minute. The capacity of the tubing was about 15 barrels. There was thus provided about 10 barrels of oil for pre-flushing the stratum to be treated.

The resin composition (about 7 barrels) consisting of the mixture of Ingredients A, B, and C was then pumped down the tubing at the rate of 0.25 barrel per minute.

Thereafter, 15 barrels of diesel oil were displaced into the tubing as a post-flush. This was equivalent to two volumes of post-flush based on the resin volume used.

Thereafter, to force the post-flush diesel oil further into the stratum being treated, 15 barrels of crude oil were pumped down the tubing.

The well was then shut in for about 30 hours during which the resin composition set to a fluid-permeable unitary solid with particles of the unconsolidated stratum with which it was in contact.

The well was then put back into production. It showed a definite reduction in detrital material carried up with the oil. The composition of resin and bonding material consolidated the stratum without objectionable interference with the passage of fluids through the formation to the wellbore.

Having described our invention, what we claim and desire to protect by Letters Patent is:

1. The method of consolidating an incompetent stratum in a subterranean formation penetrated by a well which comprises injecting down the borehole of the well and into contact with at least a portion of said stratum a composition consisting essentially of a liquid resin settable to a fluid-permeable solid, a bonding material consisting essentially of [3-(glycidyloxy)propyl]trimethoxysilane in an amount of between about 0.15 and about 10 percent, based on the volume of resin employed, whereby the bonding material is brought into contact with at least a portion of the individual grains comprising the exposed incompetent formation and provides a bond between such grains and said liquid resin, and an organic carrier vehicle selected from the class consisting of liquid hydrocarbons and $C_1$ to $C_4$ aliphatic alcohols, removing residual liquid composition from the borehole and retaining said composition in contact with the incompetent stratum until the composition has substantially set to form a unitary fluid-permeable consolidated mass with contacted particles of said stratum.

2. The method according to claim 1 wherein the amount of resin employed is between 0.25 and 9 times the pore volume of said stratum.

3. The method according to claim 2 wherein the amount of said bonding material is between about 0.5 and about 5 percent by volume of the resin employed.

4. The method according to claim 2 wherein said resin is a phenol-formaldehyde condensation product dispersed in a $C_1$ to $C_4$ aliphatic alcohol.

5. The method according to claim 2 wherein said resin is an epoxy resin containing a hardening agent.

6. The method according to claim 2 wherein said organic carrier vehicle is a liquid hydrocarbon.

7. The method according to claim 6 wherein said organic carrier vehicle is kerosene.

8. The method according to claim 2 which includes the step of pre-flushing the well with a liquid hydrocarbon prior to injection of said composition.

9. The method according to claim 2 which includes the step of post-flushing the well with a liquid hydrocarbon following injection and removal of any residual liquid composition from the borehole of said composition.

10. The method according to claim 9 which includes the step of injecting a displacing liquid selected from the class consisting of water, brine, and crude oil down the well to displace the post-flush liquid hydrocarbon from the wellbore and force said composition further into the stratum being treated.

References Cited by the Examiner

UNITED STATES PATENTS

| Re. 25,747 | 3/1965 | Hilton et al. | 166—33 |
| 2,770,306 | 11/1956 | Clark | 166—33 |
| 2,815,815 | 12/1957 | Hower et al. | 166—33 |
| 3,123,137 | 3/1964 | Young et al. | 166—33 |
| 3,199,590 | 8/1965 | Young | 166—33 |

OTHER REFERENCES

Hower, Wayne F.: Large-Scale Laboratory Investigation of Sand Consolidation Techniques, in the Journal of Petroleum Technology, Petroleum Transactions, December 1961, pp. 1221–1229, TN 860.J6.

Spain, H. H.: New Plastic Checks Sand Production, in The Oil and Gas Journal, Apr. 16, 1962, pp. 112–115, TN 860.039.

CHARLES E. O'CONNELL, *Primary Examiner.*

T. A. ZALENSKI, S. J. NOVOSAD, *Assistant Examiners.*

Disclaimer 3,310,111.—*Joseph P. Pavlich*, and *David G. Calvert*, Tulsa, Okla. METHOD OF CONTROLLING SOLIDS IN FLUIDS FROM WELLS. Patent dated Mar. 21, 1967. Disclaimer filed Jan. 23, 1969, by the assignee, *The Dow Chemical Company.*

Hereby enters this disclaimer to claims 1, 3, 4, 5, 8 and 9 of said patent.
[*Official Gazette August 12, 1969.*]